(12) United States Patent
Bahar et al.

(10) Patent No.: US 9,151,283 B2
(45) Date of Patent: Oct. 6, 2015

(54) ELECTROCHEMICAL MOTIVE DEVICE

(75) Inventors: Bamdad Bahar, Georgetown, DE (US); William Paul Parmelee, Seaford, DE (US); Steve Naugler, Hockessin, DE (US)

(73) Assignee: Xergy LTD (GB)

( * ) Notice: Subject to any disclaimer, the term of this patent is extended or adjusted under 35 U.S.C. 154(b) by 360 days.

(21) Appl. No.: 13/567,124

(22) Filed: Aug. 6, 2012

(65) Prior Publication Data

US 2013/0039779 A1 Feb. 14, 2013

Related U.S. Application Data

(60) Provisional application No. 61/574,741, filed on Aug. 8, 2011, provisional application No. 61/672,178, filed on Jul. 16, 2012.

(51) Int. Cl.
*F04B 19/20* (2006.01)
*F04B 43/02* (2006.01)
*F04B 43/04* (2006.01)

(52) U.S. Cl.
CPC .............. *F04B 19/20* (2013.01); *F04B 43/02* (2013.01); *F04B 43/043* (2013.01); *Y02E 60/50* (2013.01)

(58) Field of Classification Search
CPC ........ F04B 19/20; F04B 43/043; F04B 43/02; Y02E 60/50
USPC .................................................... 60/407, 412
See application file for complete search history.

(56) References Cited

U.S. PATENT DOCUMENTS

| 1,925,281 | A | | 3/1934 | Ranque |
| 2,913,511 | A | | 11/1959 | Grubb, Jr. |
| 3,432,355 | A | | 3/1969 | Niedrach et al. |
| 3,489,670 | A | | 1/1970 | Maget |
| 3,614,275 | A | * | 10/1971 | Eibsen .......................... 417/315 |
| 4,118,299 | A | | 10/1978 | Maget |

(Continued)

FOREIGN PATENT DOCUMENTS

| WO | 0125700 A1 | 4/2001 |
| WO | 2008007108 A1 | 1/2008 |

OTHER PUBLICATIONS

"Engineering a Membrane Electrode Assembly," John W. Weidner et al., The Electrochemical Society Interface, Winter, 2003, pp. 40-43.

(Continued)

*Primary Examiner* — Thomas E Lazo
(74) *Attorney, Agent, or Firm* — Invention to Patent Services; Alex Hobson

(57) ABSTRACT

An electrochemical motive device is described having an electrochemical cell and at least one device configured produce motion as a function of electrochemical gas produced by the electrochemical cell. One example of an electrochemical motive device is a pump having one pump chamber, and pump member that forces a pumping fluid through the chamber. An electrochemical cell provides for a transfer of gas from the anode to the cathode. A control portion is described for taking input from the electrochemical pump and controlling the voltage and current to the electrochemical cell. In one embodiment, multiple pumping chambers are configured, and in one embodiment two pumping chambers are connected. It is further described that the control portion may automatically adjust parameters as a function of inputs, including user interface inputs.

4 Claims, 8 Drawing Sheets

(56) References Cited

U.S. PATENT DOCUMENTS

| | | | |
|---|---|---|---|
| 4,385,873 A * | 5/1983 | Richter | 418/23 |
| 4,402,817 A | 9/1983 | Maget | |
| 4,523,635 A | 6/1985 | Nishizaki et al. | |
| 4,593,534 A | 6/1986 | Bloomfield | |
| 4,829,785 A | 5/1989 | Hersey | |
| 4,990,412 A | 2/1991 | Hersey | |
| 5,024,060 A | 6/1991 | Trusch | |
| 5,149,413 A * | 9/1992 | Maget | 204/258 |
| 5,547,551 A | 8/1996 | Bahar et al. | |
| 5,599,614 A | 2/1997 | Bahar et al. | |
| 5,635,041 A | 6/1997 | Bahar et al. | |
| 5,746,064 A | 5/1998 | Tsenter | |
| 5,768,906 A | 6/1998 | Tsenter | |
| 5,799,487 A * | 9/1998 | Valsamis | 60/487 |
| 5,900,031 A | 5/1999 | Bloomfield | |
| 5,976,724 A | 11/1999 | Bloomfield | |
| 5,993,619 A | 11/1999 | Bloomfield et al. | |
| 6,068,673 A | 5/2000 | Bloomfield | |
| 6,167,721 B1 | 1/2001 | Tsenter | |
| 6,254,978 B1 | 7/2001 | Bahar et al. | |
| 6,321,561 B1 * | 11/2001 | Maget | 417/379 |
| 6,425,440 B1 | 7/2002 | Tsenter et al. | |
| 6,553,771 B2 | 4/2003 | Tsenter | |
| 6,635,384 B2 | 10/2003 | Bahar et al. | |
| 6,994,929 B2 | 2/2006 | Barbir et al. | |
| 2002/0066277 A1 | 6/2002 | Tsenter | |
| 2002/0136655 A1 * | 9/2002 | Wong et al. | 418/82 |
| 2003/0155252 A1 | 8/2003 | Juda et al. | |
| 2003/0196893 A1 | 10/2003 | Mcelroy et al. | |
| 2004/0040862 A1 | 3/2004 | Kosek | |
| 2006/0230765 A1 | 10/2006 | Fedorov et al. | |
| 2006/0254286 A1 | 11/2006 | Johnson et al. | |
| 2008/0187794 A1 | 8/2008 | Weingaertner | |
| 2009/0308752 A1 | 12/2009 | Evans et al. | |

OTHER PUBLICATIONS

Technical Specifications for "HOGEN Hydrogen Generation Systems," Proton Energy Systems, Inc., Oct. 2008, 2 pages.

"Teledyne Titan(TM) HM Generator Series Hydrogen/Oxygen Gas Systems," Teledyne Energy Systems, Inc., Jun. 2007, 2 pages.

"A Comparative Study of Water as a Refrigerant with Some Current Refrigerants", International Journal of Energy Research, Int. J. energy res. 2005: 29.947-959.

* cited by examiner

ELECTROCHEMICAL MOTIVE DEVICE

CROSS REFERENCE TO RELATED APPLICATIONS

The present application claims the benefit of U.S. Provisional Patent. No. 61/574,741 filed on Aug. 8, 2011, and entitled ELECTROCHEMICAL PUMP, and U.S. Provisional Patent No. 61/672,178, filed on Jul. 16, 2012 and entitled ELECTROCHEMICAL MOTIVE DEVICE, the entirety of which are incorporated by reference herein.

BACKGROUND OF THE INVENTION

1. Field of the Invention

The invention relates generally to electrochemical motive systems that can convert pressure differential from an electrochemical cell into work, for example move an item, such as a bladder or piston, or rotate a shaft, for an electrochemical pump apparatuses, for example.

2. Background

Electrochemical cells in which a chemical reaction is forced by adding electrical energy are called electrolytic cells. Central to the operation of any cell is the occurrence of oxidation and reduction reactions which produce or consume electrons. These reactions generally take place at electrode/solution interfaces, where the electrodes must be good electronic conductors and the solution should have high ion conductivity. In operation, a cell is connected to an external voltage source, and electric charge is transferred by electrons between the anode and the cathode through the external circuit. To complete the electric circuit, ions produced at an electrode must pass through the cell to the opposing electrode. Typically an electrolyte is provided between the electrodes for this purpose.

The simplest electrochemical cell consists of at least two electrodes and one or more electrolytes. The electrode at which the electron producing oxidation reaction occurs is the anode. The electrode at which an electron consuming reduction reaction occurs is called the cathode. The direction of the electron flow in the external circuit is always from anode to cathode. In an electrolysis reaction, it is necessary to apply electric power to the cell electrodes. The electrodes are connected through the electrical leads to an external source of electric power with the polarity being selected to induce the electrolyte anion flow to the anode and the cation flow to the cathode.

Generally speaking, the anode and cathode are comprised a substrate material, such as titanium, graphite, or the like, coated with a catalyst such as lead dioxide, platinum, palladium, or other known materials. The selection of a substrate and catalyst is determined by the particular electrode reaction.

Generally, an electrolyte is a material that conducts, ions. Fuel cells are a common electrochemical application. In fuel cells, proton exchange membranes are used as electrolytic and catalyst support for providing a reaction of hydrogen oxidation on the one side of membrane and oxygen reduction on the other side. This combination of membrane and electrodes can be called a Membrane Electrode Assembly (MEA).

SUMMARY OF THE INVENTION

The invention is directed an electrochemical motive device that contains one or more electrochemical cells that can transfer an electrochemical gas from a first side to a second side and thereby increase pressure in a chamber which can be converted into work. In one embodiment, a dual hydrogen half-cell is used, however any electrochemical system that generates a gas could be utilized, for example, a Cl-Cl2 half-cell. In a dual hydrogen half-cell, generally referred to as a hydrogen pump, the second side, high-pressure side, is the cathode side, which is connected back to the first side, anode side. Within the connection back to the anode side, the hydrogen passes through a device that converts the pressure differential into motion, and this device may be any suitable device including, but not limited to, a jet to act as a venturi, or to act on an impeller to cause rotation of a shaft, a linear actuator that exhausts the pressure at the end of the stroke, a pump and the like.

In one embodiment, the electrochemical motive device, as described herein is a dynamic motive device, wherein the gas transferred across the electrochemical cell is used in a dynamic motive device to create work, and subsequently return to the opposing side of the electrochemical cell. For example, a gas may be produced on a first electrode of an electrochemical motive device and connected with a dynamic motive device, such as a sliding vane device. The gas creates motion as it moves through the dynamic motive device and is subsequently returned to a second electrode of the electrochemical motive device. A dynamic motive device may comprise any suitable configuration for creating motion including, but not limited to, an impeller or paddle, a linear actuator, a venture. A dynamic motive device may be any suitable type of device that uses compressed gas as a driving force. There are many types of tools and devices that use compressed gas, such as drills, sanders, nail guns and the like.

In one embodiment, at least one pump chamber is connected with the electrochemical cell, and the pump chamber is configured with at least one pump member for the pumping of fluid through the pump. A control portion controls the pumping of a fluid through the electrochemical pump. The pump chamber may be configured with an inlet valve and an outlet valve and the control portion may control the opening and closing of the valves to facilitate pumping of fluid through the electrochemical pump.

An electrochemical pump may comprise a power supply that provides a voltage and current to the electrochemical cell. A control portion may control the voltage and current to the electrochemical cell as a function of inputs from a user interface or from sensors, such as pressure, or fluid flow sensors, or from any combination thereof. In one embodiment, the control portion automatically controls the voltage and current to the cell or cells as a function of the desired output, such as the rpm of a shaft or the pulse rate of an actuator. When plumbed correctly, the control system could induce an oscillatory motion by switching the polarity of the DC voltage and inlet pressure of the fluid to be pumped. For example, a pressure sensor may be located within the pressure chamber and the control portion, may control the voltage and/or a voltage/time "wave form".

Pressure sensors may be configured within a pump chamber, such as on the first or second side of the pump member. In addition, pressure sensors may also be configured prior to the inlet of the pump. Fluid flow sensors may be configured in any suitable location within or on the pump, such as at the inlet or exit, of a pump chamber. The control portion may control the voltage and/or current to the electrochemical cell in response to the fluid flow sensor.

The electrochemical pump may comprise one, two, three or more pump chambers. A pump chamber may comprise one or more valves, such as an inlet and outlet valve. The control portion of the electrochemical pump may control the opening and closing of these valves to facilitate the pumping of a fluid through the pump chamber.

In one embodiment, the electrochemical pump is comprised of two pump chambers, one connected to either side of an electrochemical cell or series of electrochemical cells. A gas may be transferred across the electrochemical cell to raise the pressure in a first pump chamber and cause a fluid to be pumped there from. Subsequently, the gas may be transferred from the first pump chamber to the second pump chamber to cause a fluid to be pumped through the second pump chamber. As the gas is evacuated from the first pump chamber, the reduction in pressure pulls fluid into the first pump chamber. In one embodiment, two different fluids are pumped through the first and second pump chambers. In another embodiment, the same type of fluid is pumped from a first and second pump chamber. In yet another embodiment, a first and second pump chamber are connected with a connected portion and a fluid is pumped through both the first and second pump chambers.

A pump chamber may comprise any suitable pump member such as but not limited to a diaphragm, a piston, a bladder, a tube or series of tubes, and the like. In one embodiment, a pump chamber comprises a diaphragm having a first side in contact with electrochemical gas, and a second side in contact with pumping fluid. A diaphragm may comprise any suitable material or combinations of materials. For example, in one embodiment a low permeation material is used as a diaphragm to prevent the loss of electrochemical gas from the electrochemical pump chamber. The diaphragm may comprise any suitable material including, but not limited to, fluoropolymer, such as PTFE, or CTFE, or polyimide and the like. In another embodiment, a diaphragm comprises a durable resilient material, such as a rubber, elastomer, or fluoroelastomer. The diaphragm may comprise a combination of materials, such as a laminate, or composite. Two or more diaphragm may be used in one pump chamber. For example, a first and second diaphragm may be separated by a fluid.

The electrochemical pump may comprise a gas sorption chamber, wherein the electrochemical gas may be contained. The electrochemical gas may be transferred across the electrochemical cell from a pump chamber to a gas sorption chamber. Gas contained with the gas sorption chamber may be transferred across the electrochemical cell to the pump chamber. The gas sorption chamber may comprise any suitable material or apparatus for containing the electrochemical gas. For example, the gas sorption chamber may comprise a gas sorption material, such as nickel metal hydride. In another embodiment, the gas sorption chamber may comprise a volume of space or an expanding volume of space. The gas sorption chamber may be configured with a diaphragm, bladder, or piston, for example.

The electrochemical pump may comprise at least one auxiliary gas portion that may be used to supply an additional amount of electrochemical gas to the electrochemical cell. For example, the auxiliary gas portion may comprise a reservoir tank of electrochemical gas, and a valve between the reservoir and the electrochemical cell may be open to provide an additional amount of electrochemical gas. In another embodiment, a liquid gas reservoir may be used. In yet another embodiment, a chemical reaction of a material held in a reservoir converts the material in the auxiliary gas portion to electrochemical gas for use in the electrochemical pump. Still, in another embodiment, the auxiliary gas portion comprises a generator. The control portion of the electrochemical pump may control the addition of electrochemical gas to the electrochemical cell from the auxiliary gas portion in response to a user interface, a sensor, such as a flow, or pressure sensor, or any combination thereof, The electrochemical cell may be any suitable type, including but not limited to molten carbonate, phosphoric acid, proton exchange membrane (PEM) fuel cells and the like. In one embodiment, the electrochemical cell is a proton exchange membrane fuel cell, that utilizes hydrogen electrodes as both the cathode and anode. Hydrogen electrodes are capable of both generating and consuming hydrogen.

The reactions which occur at the hydrogen cathode:

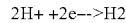

$2H+ +2e- \rightarrow H_2$ and at the hydrogen anode;

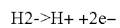

$H_2 \rightarrow H+ +2e-$

The net product of the overall reaction is heat. Hydrogen is produced at the cathode and hydrogen is consumed at the anode.

The electrochemical pump described herein may provide a method for pumping a fluid, wherein the control portion controls the voltage and/or current to electrochemical cell that causes a gas to transfer across the electrochemical cell and increase the pressure within a secondary or pump chamber. In one embodiment a pump member within the pump chamber pushes or pumps a fluid out of the pump chamber. The control logic, may then open an inlet valve of a pump chamber and change the voltage and/or current to the electrochemical cell to transfer electrochemical gas back across the electrochemical cell, and therein draw fluid into the pump chamber. The inlet valve may then be closed, via the control portion, and the process may be repeated.

The method of pumping a fluid as described herein, may be further regulated by a user interface. The user interface, may be used to set a desired valued or Increase in value of, for example, the fluid flow rate, the maximum pressure within a chamber, the pump rate, limits on the pressure and the like. For example the user may want to increase the fluid flow rate, and may turn a dial for a desired increase. The control portion may change the voltage and/or current to the electrochemical cell, or rate of change of voltage and current to the electrochemical cell for this purpose. In addition, the control portion may open a valve to the auxiliary gas portion to increase the amount of electrochemical gas.

In one embodiment, the method of pumping a fluid comprises an electrochemical pump having two or more pump chambers. The pump chambers may have a connecting portion and a fluid may be pumped through the two or more pump chambers. For example, in one embodiment, two pump chambers are configured on either side of at least one electrochemical cell. A fluid is pumped from a first pump chamber through a connecting portion, to a second pump chamber. Different fluids may be pumped in the two or more pump chambers.

The summary is provided as an introduction to some of the embodiments described herein and is not to be construed as limiting the scope of t invention. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of his specification, illustrate embodiments of the invention, and together with the description serve to explain the principles of the invention.

DETAILED DESCRIPTION OF THE ILLUSTRATED EMBODIMENTS

Figure 1:
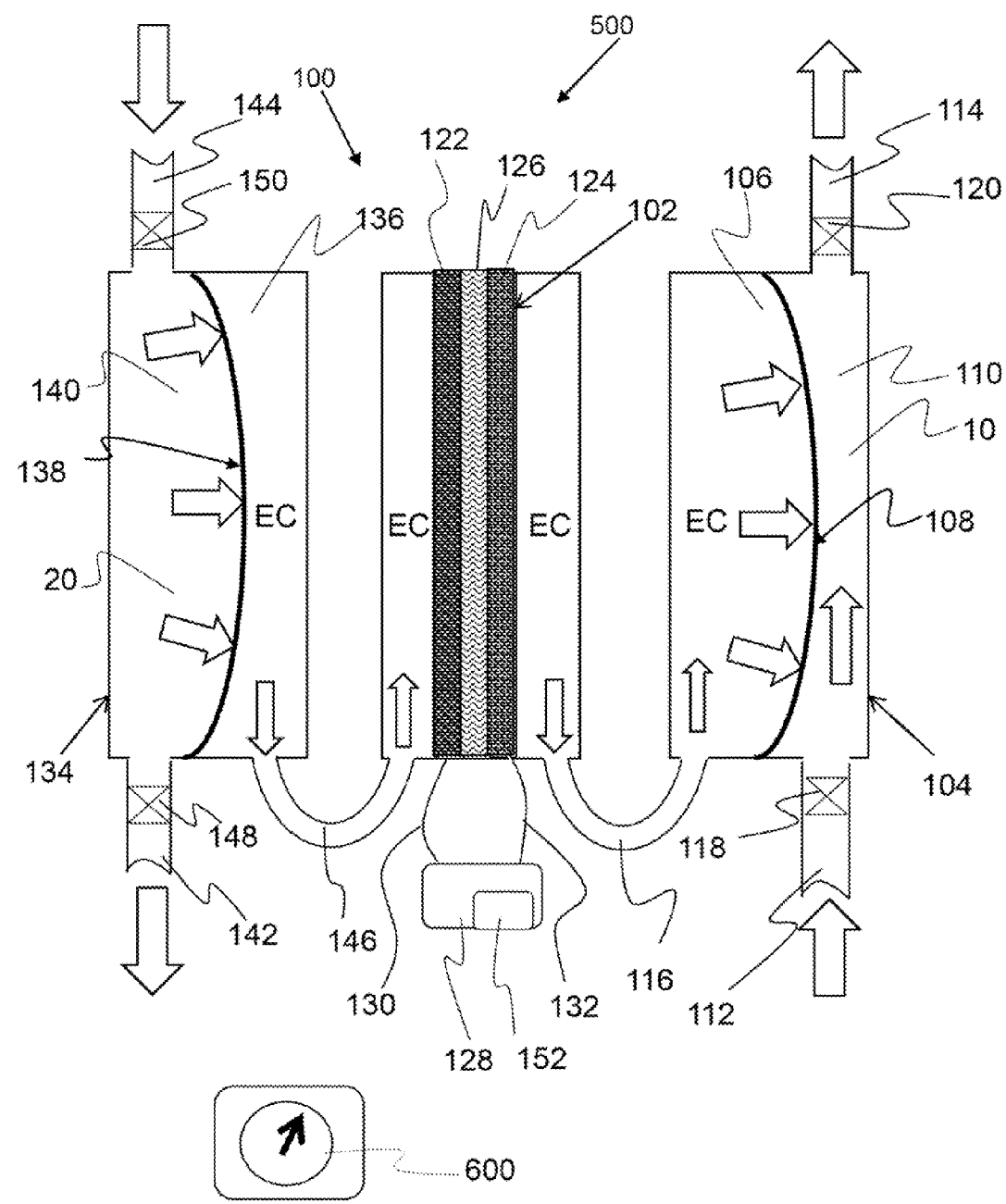

FIG. 1 shows a cross sectional diagram of an electrochemical pump described herein.

Figure 2:
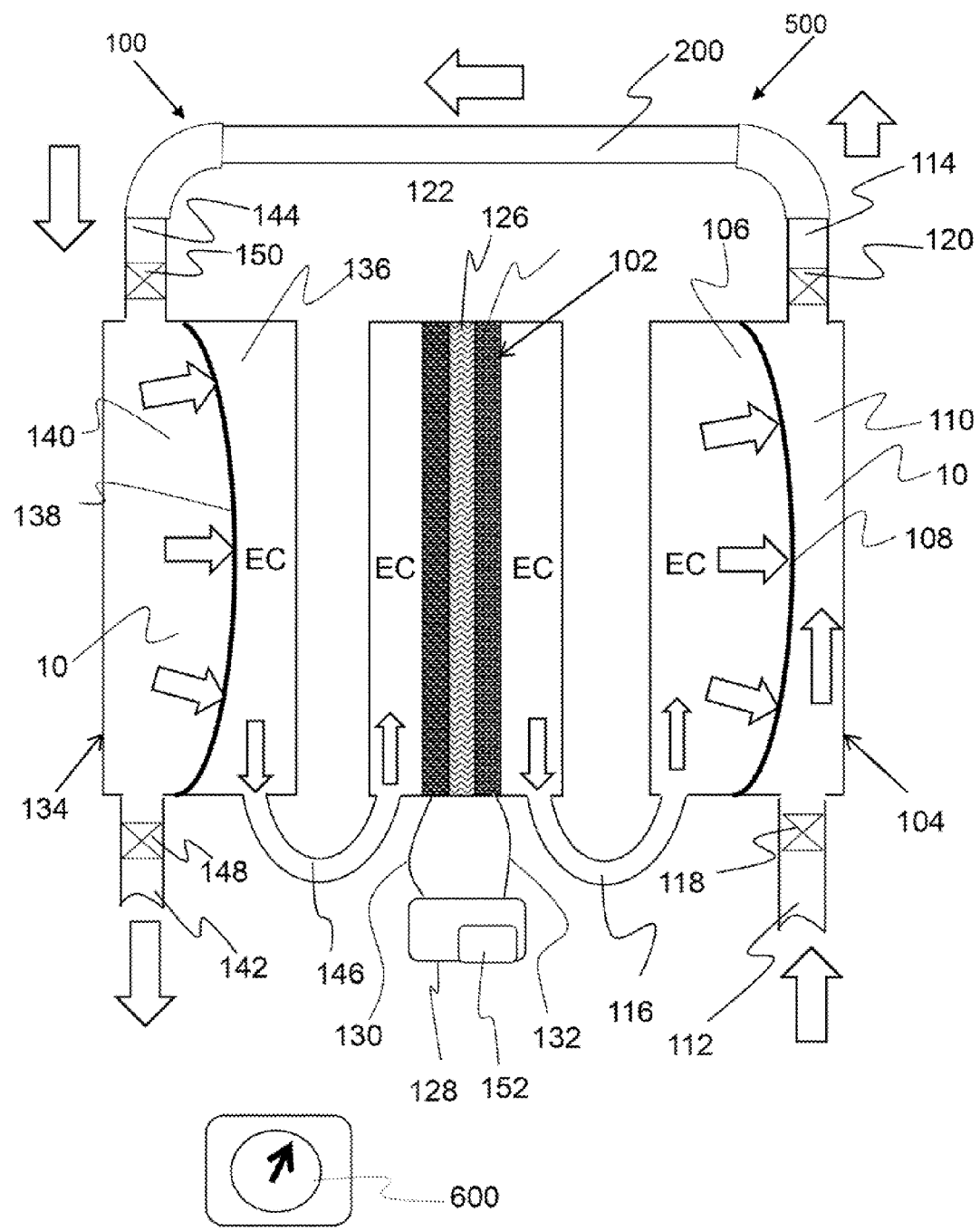

FIG. 2 shows a cross sectional diagram of an electrochemical pump having two pumping chambers and a connecting portion described herein.

Figure 3:
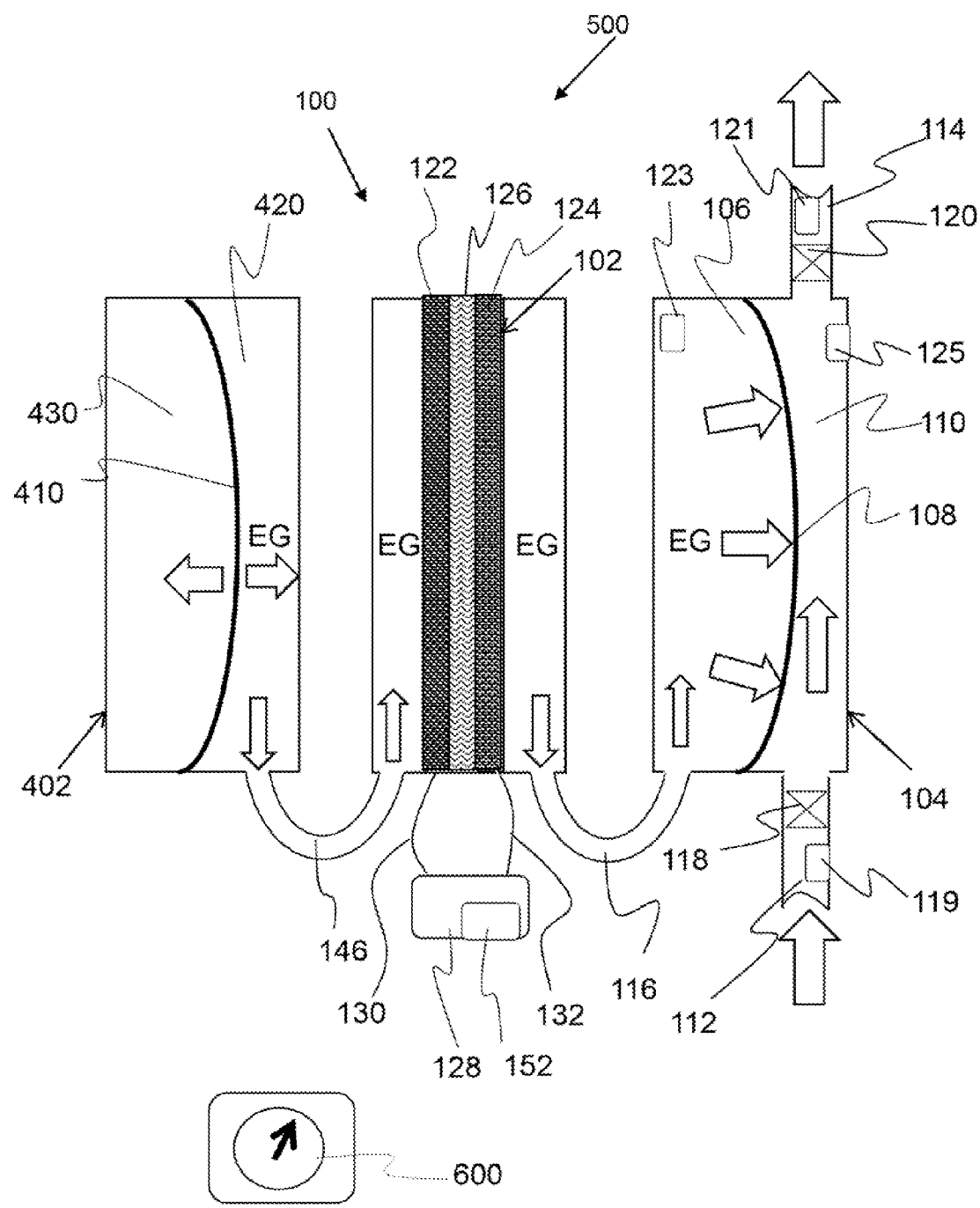

FIG. 3 shows a cross sectional diagram of an electrochemical pump having a gas sorption chamber described herein.

Figure 4:
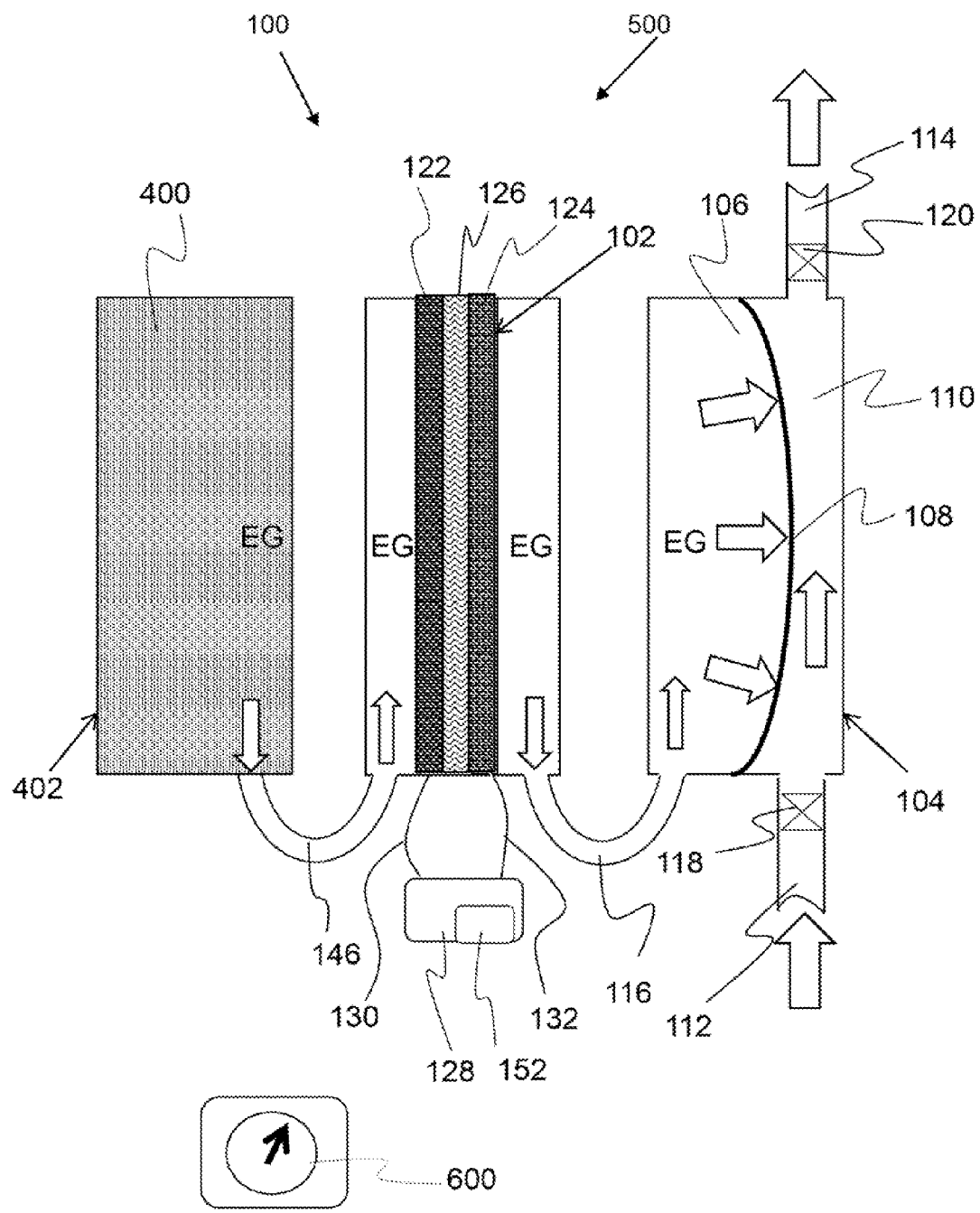

FIG. 4 shows a cross sectional diagram of an electrochemical pump having a gas sorption chamber described herein.

Figure 5:
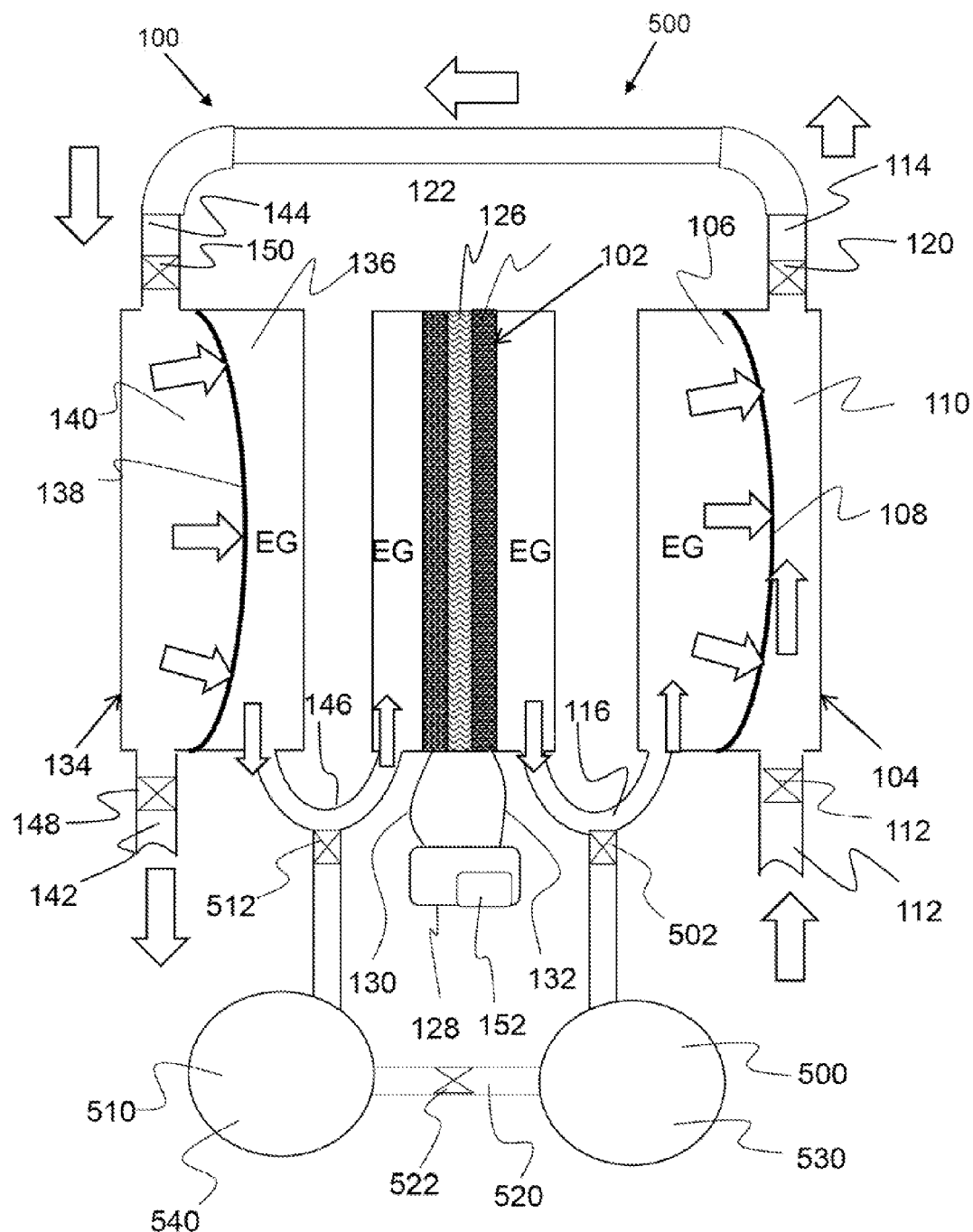

FIG. 5 shows a cross sectional diagram of an electrochemical pump having an auxiliary gas portion described herein.

Figure 6:
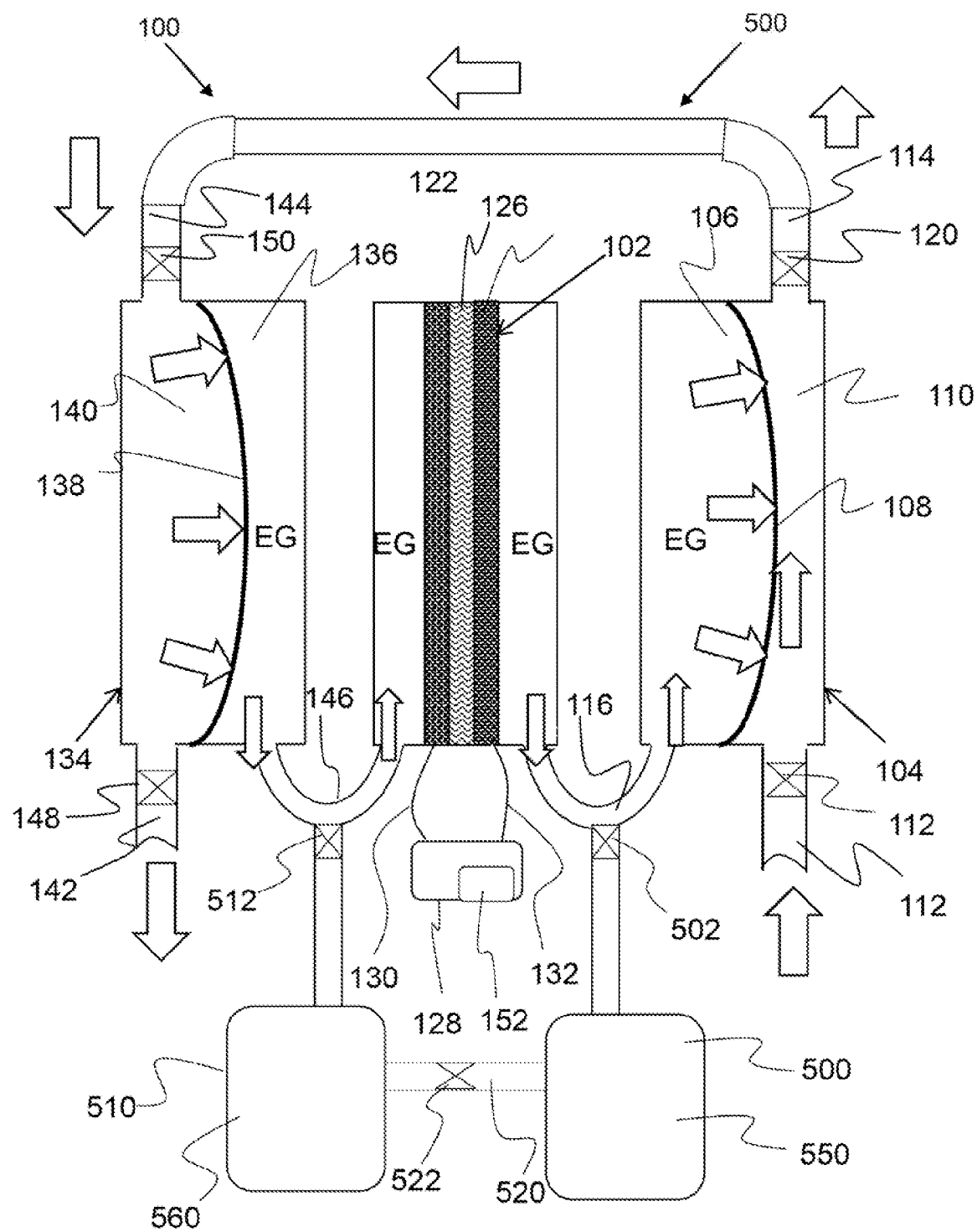
Figure 7:
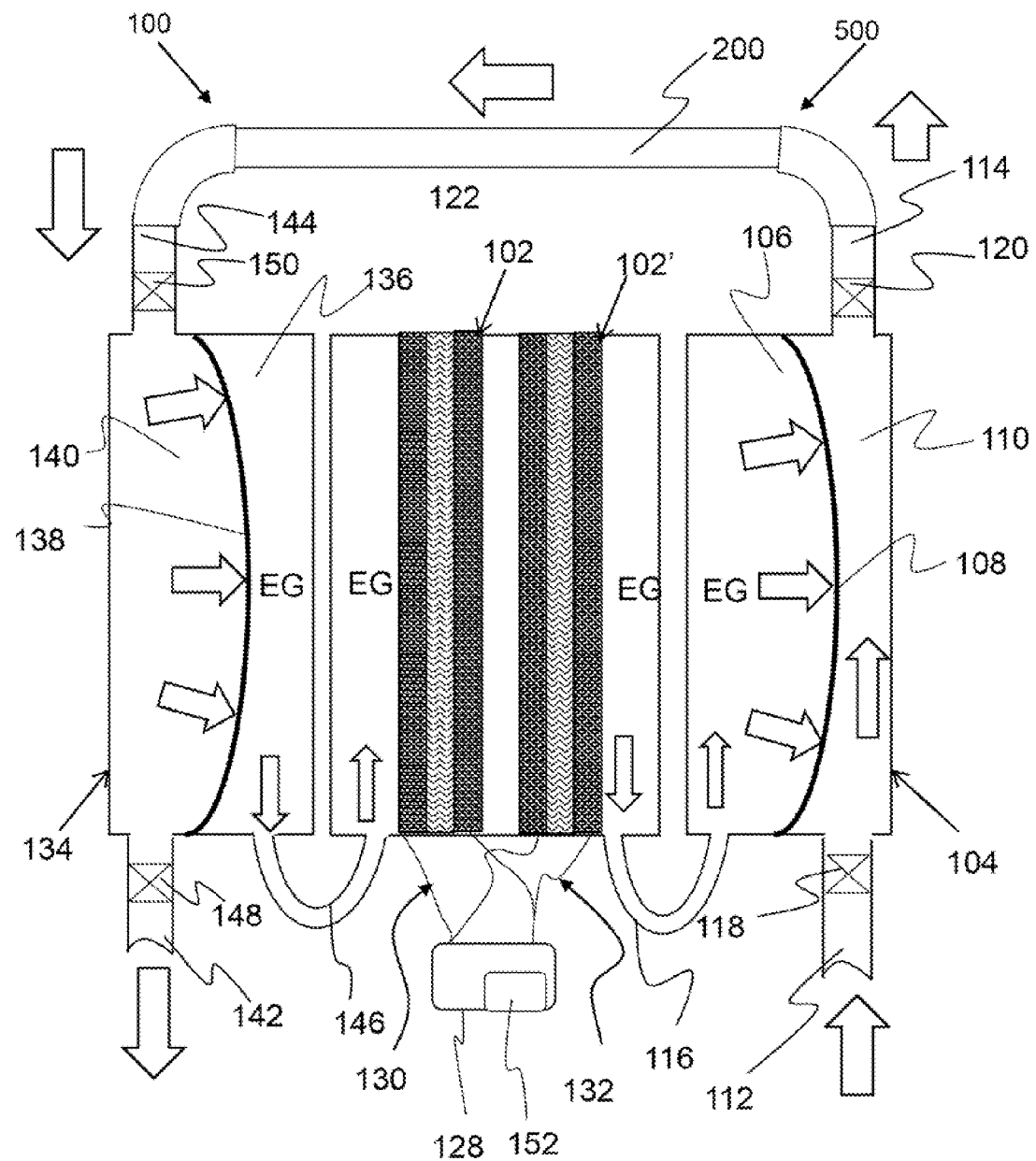

FIG. 6 shows a cross sectional diagram of an electrochemical pump having an auxiliary gas portion described herein FIG. 7 shows a cross sectional diagram of an electrochemical pump having a two electrochemical cells connected in series.

Figure 8:
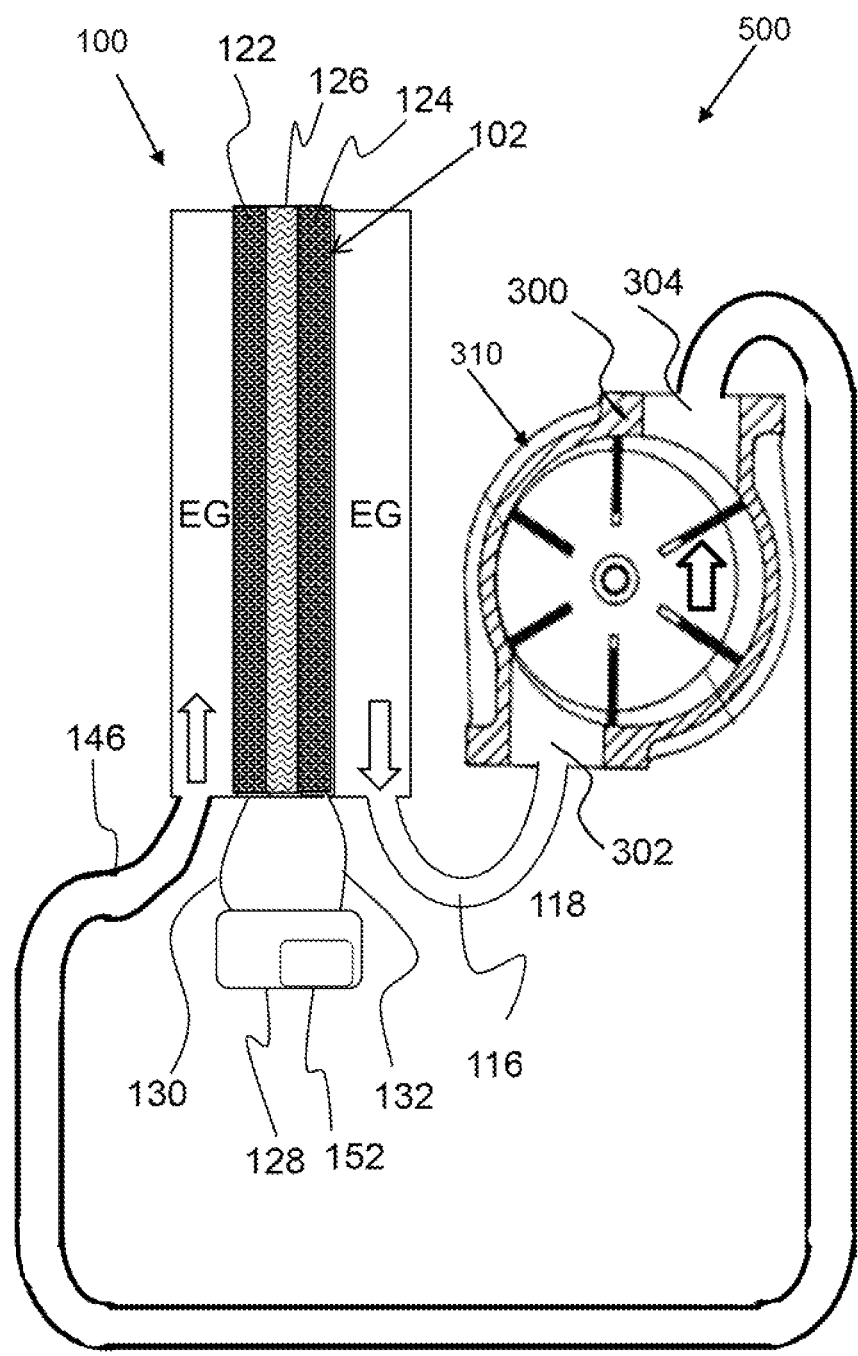

FIG. 8 shows a cross sectional diagram of a sliding vane device connected with a electrochemical motive device as described herein.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention, As used herein, the terms "comprises," "comprising," "includes," "including," "has," "having" or any other variation thereof, are intended to cover non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Definitions

Electrochemical motive device, as used herein, is defined as any device whereby motion of the device is powered at least in part by electrochemical gas produced by an electrochemical cell as described herein.

Dynamic electrochemical motive device, as used herein, is an electrochemical motive device wherein the electrochemical gas produced on a first electrode passes through a dynamic motive device and returns to an opposing electrode.

A dynamic motive device is a device that has motion as a function of electrochemical gas flowing through it. Work is created by an electrochemical gas pressure differential across the dynamic motive device. An electrochemical pump having a pump chamber is not a dynamic motive device, as the electrochemical gas does not flow through the pump chamber, rather the electrochemical gas flows into and back out of the pump chamber. One example of a dynamic motive device is a sliding vane device, as described herein.

Electrochemical pump, as used herein, is a type of electrochemical motive device whereby an electrochemical gas creates a pressure in a pump chamber, as defined herein, thereby pumping a fluid therefrom, Electrochemical gas may be any gas that is transferred electrochemically through the electrochemical cell. The phrase "gas is transferred across the electrochemical cell", means that the gas is electrochemically transferred as described herein.

Pump chamber, as used herein, is defined as a volume wherein electrochemical gas from an electrochemical cell is collected, thereby creating pressure to pump a liquid. In an exemplary embodiment, a pump chamber comprises a diaphragm type pump member separating the electrochemical gas from the pumped fluid.

Continuous pump, as used herein, is defined as an electrochemical pump that is configured to pump a fluid through cycling of electrochemical cell such that the electrochemical gas is transferred across the electrochemical cell.

Pumping fluid, as used herein, is defined as the fluid that is actively pumped through the pumping chamber. The electrochemical pump may pump one or more types of fluids.

Fluid, as used herein, means any gas or liquid most cases, a liquid will be pumped by the electrochemical cell described herein.

Pump rate, as used herein, is the rate of pump sequences as a function of time. For example a pump rate of four pumps/minute, for a one pump chamber configuration, means that fluid is pumped from the pump chamber 4 times per minute. In a two pump chamber configuration, four pumps per minute means one two pump sequences per chamber.

Connected to as used herein in reference to the pumping portion and the electrochemical cell means that there is a gas connection either directly or through a transfer portion between the two spaces. A valve may be located within a transfer portion that may effectively temporarily terminate a gas connection between these two spaces.

Connected to, as used herein, in reference to the control portion and auxiliary components such as valves, sensors and the like, means that the control portion can receive an input from the components through any means such as but not limited to hard wire, or through wireless means.

Certain exemplary embodiments of the present invention are described herein and illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

In an exemplary embodiment an electrochemical pump is provided that contains one or more electrochemical cells that can transfer an electrochemical gas from a first side to a second side and thereby increase pressure in a pump chamber to pump fluid. At least one pump chamber is connected with the electrochemical cell. The pump chamber is configured with at least one pump member for the pumping of fluid through the pump. A control portion controls the pumping of a fluid through the electrochemical pump. The pump chamber may be configured with an inlet valve and an outlet valve and the control portion may control the opening and closing of the valves to facilitate pumping of fluid through the electrochemical pump.

As shown in FIG. 1, the electrochemical pump 100 type electrochemical motive device 500 comprises an electrochemical cell 102, wherein the electrochemical cell gas (EG) is transferred from the anode 122 to the cathode 124, across the electrolyte 126. The electrochemical gas increases in pressure on the cathode side and is transferred to the pump chamber 104 via a transfer portion 116. The increasing pressure within the first side 106 of the pumping chamber 104, forces the pumping member 108 against the fluid 10 on the second side 110 of the pumping chamber. The control portion 152 may control the opening and closing of the first inlet valve 118, and first outlet valve 120 such that the fluid 10 is pumped from the first pump chamber 104. The control portion may then reverse the polarity of the electrochemical cell. This reversal of polarity will then cause the electrochemical gas to transfer from the first pump chamber 104, through the first transfer portion 116 and through the electrochemical cell 102. The electrochemical gas will then again be transferred through a second transfer portion, 146, into a second pump chamber 134. The electrochemical gas will then force the second pumping member 138 against a second fluid 20. The second inlet valve 150, and second outlet valve 148, may be opened and closed in order to facilitate pumping of fluid 20 through the second pump chamber. In one embodiment, the same type of fluid is pumped through a first and second pump chamber. In another embodiment, different fluids are pumped through the first and second pump chambers.

A pumping chambers may be in direct communication with the electrochemical cell and share a common space void of a transfer portion 116, 146. In addition, a valve may be configured between the electrochemical cell 102, and a pumping portion 104, such as in a transfer portion 116, for example.

The power supply 128 is connected with the electrochemical cell, and the control portion 152 may be connected with any number of components of the electrochemical motive device, including but not limited to, the power supply, valves, sensors, a user interface and the like.

The electrochemical cell may be any suitable type, including but not limited to molten carbonate, phosphoric acid, proton exchange membrane (PEM) fuel cells and the like. In one embodiment the electrochemical cell is a proton exchange membrane fuel cell, that utilizes hydrogen electrodes as both the cathode and anode. Hydrogen electrodes are capable of both generating and consuming hydrogen.

Proton exchange membranes (PEM) designed for fuel cells may be utilized in the present invention. These proton exchange membrane fuel cells ("PEMFC") can contain catalysts for hydrogen production and consumption on both sides of membrane or anode and cathode. The catalyst generally consists of a small amount of platinum (Pt) mostly from 0.05 mg/cm2 up to 1 mg/cm². With fuel cells, the respective sides of the membrane generally contain a slightly different catalyst, specifically for processes of hydrogen oxidation and oxygen reduction, which occur by operation of the fuel cell. Although unsymmetrical PEMFCs may be used, it is preferable to use symmetrical hydrogen electrodes. "Symmetrical" means that both sides of a PEMFC contain substantially identical hydrogen electrodes. In this case an individual cell is designed to produce and consume hydrogen and to work as hydrogen pump.

The following reaction occurs at the hydrogen cathode:

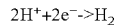

and the following reaction occurs at the hydrogen anode:

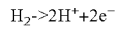

The net product of the overall reaction is heat. Hydrogen is produced at the cathode and hydrogen is consumed at the anode.

A preferred embodiment utilizes symmetrical hydrogen electrodes. In this design, a hydrogen electrode is utilized as a cathode to produce hydrogen and the opposing electrode to consume hydrogen (the anode). In between these two electrodes, it is preferable to utilize a proton exchange membrane ("PEM"). It is preferable that the proton exchange membrane placed between the anode and cathode is made of a polymer material having sulfonate functional groups contained on a fluorinated carbon backbone. In one embodiment the electrolyte comprises a perfluorosulfonic acid polymer. Two such materials include a NAFION PEM having an equivalent weight of 1100 grams and a Dow experimental PEM (XUS-13204.20) having an equivalent weight of 800. NAFION is a sulfonic acid membrane sold by E. I. du Pont de Nemours and Company having a substantially fluorinated backbone and pendant groups according to the following structures:

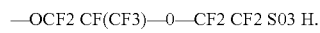

Any suitable equivalent weight and any suitable thickness of the PEM may be used. In one embodiment, a reinforced PEM is used, such as those available from W.L. Gore and Associates, Newark, Del. under the trade name GORE-SELECT®.

In addition, it is anticipated that a sulfonated polymer having a nonfluorinated carbon backbone would be operable according to the present invention. Such a polymer might include polystyrene sulfonate. Additionally, such a material might be coated with a fluorinated material to increase its resistance to chemical attack. It is also anticipated that a proton exchange membrane made of a polymer material having carboxylate functional groups attached to a fluorinated carbon backbone would be operable according to the present invention. Examples include those available from Tokuyama. Soda Company under the trademark "NEOSEPT-F", Asahi Glass Company under the trademark "FLEMION", Asahi Chemical Industry Company under the trademark "ACIPLEX-S", and Tosoh Corporation under the trademark "TOSFLEX IE-SA48." Further, polymeric systems based on perfluoro bis-sulfonimides (CF3-[CF2 S02 NHS02 CF2]n —CF3); perfluoro phosphonic acids, and the corresponding carbanion acids may function satisfactorily as proton exchange membranes. The preferred PEMs contain perfluorinated sulphonic acids that display a very high resistance to chemical attack, such as NAFION 117 and NAFION 115.

Any suitable arrangement or configuration of the MEA may be used. In one embodiment, a PEMFC comprises a gas diffusion media. In another embodiment the electrochemical cell comprises support materials, such as netting or screen to resist deformation from pressure differentials across the cell.

A pressure differential is established between the two hydrogen electrodes through production of hydrogen by applying a positive polarity to the first hydrogen electrode of one cell and consuming hydrogen by applying a negative polarity to the second hydrogen electrode of the other cell. The power supply can be a reverse-polarity power supply capable of switching the direction of current applied which reverses the function of the respective cells. The power supply may be a battery or a rectifier or any other electric source capable of delivering direct current.

The moving force for hydrogen transfer is provided as a result of the difference in hydrogen pressure between the producing and consuming cells. The voltage value on the cell (V) depends upon the impedance of the internal cell. The relationship between current (I) and hydrogen flow (F) is directly correlated to the pressure differential in the cell as defined by Faraday's Law:

$$F=0.11 \times I \text{ ml/sec}$$

The required power value for providing hydrogen flow, F, is:

$$W=V \times F/0.11$$

where V is expressed in volts, and W in watts,

It is possible to use a plurality of cells electrically connected in a series. In this case the hydrogen flow, F, would be equal to:

F=0.11×N×I ml/sec (only if plumbed in parallel)
with N being the total number of cells.

As shown in FIGS. 1-8 the electrochemical motive device comprises a power supply 128 that provides a voltage and current to the electrochemical cell 102. The control portion 152 may control the voltage and current to the electrochemical cell as a function of inputs from a user interface 600 or from sensors, such as pressure sensors 123, or fluid flow sensors 119, 121, or from any combination thereof, as shown in FIG. 3. In one embodiment, the control portion automatically controls the voltage and/or current to the cell or cells as a function of the inlet pressure of the fluid to be pumped. For example, a pressure sensor 123 may be located within the pressure chamber and the control portion, may control the voltage and current and rate of change of voltage and current in response to the pressure sensor. The control of the voltage and current to the electrochemical cell includes the magnitude of the values as well as the rate of change of the values, including the rate of change of switching from the anode to the cathode or pump rate.

As shown in FIG. 3, pressure sensors 123, 125 may be configured within a pump chamber, such as on the first or second side of the pump member. In addition, pressure sensors may also be configured prior to the inlet of the pump. Fluid flow sensors 119, 121, may be configured in any suitable location within or on the pump, such as at the inlet 112 or outlet 114 of a pump chamber. The control portion may control the voltage and/or current to the electrochemical cell in response to the fluid flow sensor.

The electrochemical pump may comprise one, two, three or more pump chambers. A pump chamber may comprise one or more valves, such as an inlet 118, 150, and outlet valves 120, 148 as shown in FIG. 1. The control portion of the electrochemical pump may control the opening and closing of these valves to facilitate the pumping of a fluid through the pump chamber.

As shown if FIG. 2, the electrochemical pump is comprised of two pump chambers, one connected with either side of an electrochemical cell. An electrochemical gas may be transferred across the electrochemical cell to raise the pressure in a first pump chamber 104 and cause a fluid to be pumped therethrough. Subsequently, the electrochemical gas may be electrochemically transferred from the first pump chamber 104 to the second pump chamber 134 to cause a fluid to be pumped through the second pump chamber. In one embodiment, two different fluids are pumped through the first and second pump chambers. In another embodiment, the same type of fluid is pumped from a first and second pump chamber. In yet another embodiment, a first and second pump chamber are connected with a connected portion 200 and a fluid 10 is pumped through both the first and second pump chambers.

A pump chamber may comprise any suitable pump member such as but not limited to a diaphragm, a piston, a bladder, a tube such as a pump tube or series of tubes, and the like. In one embodiment, a pump chamber comprises a diaphragm 108 having a first side in contact with electrochemical gas, and a second side in contact with pumping fluid, or fluid that is pumped by the electrochemical motive device. A diaphragm may comprise any suitable material or combinations of materials. For example, in one embodiment a low permeation material is used to prevent the loss of electrochemical gas from the electrochemical pump. In another embodiment, a diaphragm comprises a durable resilient material, such as a rubber, elastomer, or fluoroelastomer. The diaphragm may comprise a combination of materials, such as a laminate, or composite. Two or more diaphragm may be used in one pump chamber. For example, a first and second diaphragm may be separated by a fluid.

The electrochemical pump as shown in FIGS. 3 and 4 may comprise a gas sorption chamber 402, wherein the electrochemical gas may be contained. The electrochemical gas may be transferred across the electrochemical cell from a pump chamber to a gas sorption chamber. Gas contained with the gas sorption chamber may be transferred across the electrochemical cell to the pump chamber. The gas sorption chamber may comprise any suitable material or apparatus for containing the electrochemical gas. For example, the gas sorption chamber 402 may comprise a gas sorption material 400, such as nickel metal hydride, as shown in FIG. 4. Heat or other means to evolve the gas from the gas sorption material may be used.

In another embodiment, as shown in FIG. 3, the gas sorption chamber may comprise a volume of space or an expanding volume of space. The gas sorption chamber may be configured with a diaphragm, bladder, or piston, for example. As shown in FIG. 3, the gas sorption chamber 402 has a first side 420 and second side 430, separated by a diaphragm 410. The diaphragm in this configuration will expand and contract as electrochemical gas enters and exits the gas sorption chamber, as indicated by the arrows pointing in opposing directions on either side of the diaphragm 410.

As shown in FIG. 5, the electrochemical pump may comprise at least one auxiliary gas portion 500, that may be used to supply an additional amount of electrochemical gas to the electrochemical cell. For example, the auxiliary gas portion 510 may comprise a reservoir tank of electrochemical gas 530, and a valve 502 between the reservoir and the electrochemical cell 102 that may be open to provide an additional amount of electrochemical gas. In some embodiments, two or more auxiliary gas portions may be used. In some embodiments, a separate auxiliary gas portion may be connected with each pumping chamber. As shown in FIG. 5, a second auxiliary gas portion, 510 is connected to a second pump chamber 134. In addition, a second valve 512 is located between the second auxiliary gas portion and the electrochemical cell.

In another embodiment, a liquid gas reservoir may be used as the auxiliary gas portion. In yet another embodiment, a chemical reaction of a material held in auxiliary gas portion converts the material in the auxiliary gas portion to electrochemical gas for use in the electrochemical pump. Still, in another embodiment, the auxiliary gas portion comprises a generator such as a first generator 550 connected with a first pump chamber 104 and a second generator 560 connected with a second pump chamber 134 as shown in FIG. 6. The control portion of the electrochemical pump may control the addition of electrochemical gas to the electrochemical cell from the auxiliary gas portion in response to a user interface, a sensor, such as a flow, or pressure sensor, or any combination thereof.

The electrochemical pump described herein may provide a method for pumping a fluid, wherein the control portion controls the voltage and/or current to electrochemical cell that causes a gas to transfer across the electrochemical cell and increase the pressure with a pump chamber. A pump member within the pump chamber then pushes or pumps a fluid out of the pump chamber. The control logic, may then open an inlet valve of a pump chamber and change the voltage and/or current to the electrochemical cell to transfer electrochemical gas back across the electrochemical cell, and therein draw fluid into the pump chamber. The inlet valve may then be closed, via the control portion, and the process may be repeated.

The method of pumping a fluid as described herein, may be further regulated by a user interface. The user interface, may be used to set a desired valued or increase in value of, for example, the fluid flow rate, the maximum pressure within a chamber, the pump rate, limits on the pressure and the like. For example, the user may want to increase the fluid flow rate, and may turn a dial for a desired increase. The control portion may change the voltage and/or current to the electrochemical cell, or rate of change of voltage and current to the electrochemical cell for this purpose. In addition, the control portion, may open a valve to the auxiliary gas portion to increase the amount of electrochemical gas.

In one embodiment, the method of pumping a fluid comprises a electrochemical pump having two or more pump chambers. The pump chambers may have a connecting portion and a fluid may be pumped through the two or more pump chambers. For example, in one embodiment, two pump chambers are configured on either side of at least one electrochemical cell. A fluid is pumped from a first pump chamber through a connecting portion, to a second pump chamber. Different fluids may be pumped in the two or more pump chambers The electrochemical pump described herein may automatically adjust to accommodate different fluids. For example, the control portion of the electrochemical pump may take input from sensors, such as pressure or flow sensor to adjust valve openings, and the voltage and/or current, as well as the switching frequency to the electrochemical cell in order to maximize flow rates.

The control portion may comprise any suitable combinations of controls as well known in the art. The control portion, may have any series or algorithms, or programs, that control the operation of the electrochemical pump under any variety of situations. For example, the electrochemical pump may further comprise a temperature sensor that is connected to the control portion. The control portion may be pre-programmed to slow down or cease pumping if the temperature rises above a preset limit.

FIG. 7 shows a cross sectional diagram of an electrochemical pump having a two electrochemical cells connected in series. Any number of electrochemical cells may be connected in any suitable way, including in series as shown in FIG. 7. In addition, any number of electrochemical cells may be connected to a pump chamber or a dynamic motive device.

FIG. 8 show a cross sectional diagram of an exemplary electrochemical motive device 500 comprising a sliding vane 300 type dynamic motive device 310 connected with an electrochemical cell 100 as described herein. One side of the electrochemical cell, the cathode 124 is connected with the inlet portion 302 of the sliding vane device 300, and the outlet portion 304 is connected with a second side, anode 122 of an electrochemical cell. The flow of electrochemical gas dynamic through the dynamic motive device 310. The flow of electrochemical gas through the device 310 creates motion that can be used to do work.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An electrochemical motive device comprising:
   a. at least one electrochemical cell having a first and second side;
   b. electrochemical pump comprising:
      a sliding vane device comprising:
         a plurality of pump chambers separated by pump members and configured about an axis:
         an inlet; and
         an outlet configured in an offset location from the inlet about the axis of the sliding vane device;
      wherein the at least one electrochemical cell is connected with the inlet and outlet and wherein the control portion controls the electrochemical cell;
   b. a power source; and
   c. a control portion,
   wherein the first side of at least one electrochemical cell is connected with the inlet of the sliding vane device and the second side of the at least one electrochemical cell is connected with the outlet of the sliding vane device; and
   wherein a flow of electrochemical gas, produced by the at least one electrochemical cell, flows from the first side of the at least one electrochemical cell through the inlet into one of the plurality of pump chambers to rotate said pump chamber to the outlet portion of the sliding vane device, wherein said electrochemical gas flows through said outlet to said second side of the at least one electrochemical cell; and
   wherein the power source is connected with the electrochemical cell, and wherein the control portion controls the electrochemical cell.

2. The electrochemical motive device of claim 1, wherein the power source provides a voltage and a current, and wherein the control portion controls the voltage and/or the current to the electrochemical cell to induce electrochemical transfer of an electrochemical gas from the first side of the electrochemical cell to a second side of an electrochemical cell.

3. The electrochemical motive device of claim 1, wherein the electrochemical pump is a continuous type pump.

4. The electrochemical motive device of claim , wherein the electrochemical cell comprises a proton exchange membrane.

* * * * *